2,957,876
Patented Oct. 25, 1960

2,957,876
N-AMINOPIPERIDINIUM SALT

Bernard Rudner, Pittsburgh, Pa., assignor to W. R. Grace & Co., New York, N.Y., a corporation of Connecticut No Drawing. Filed Oct 7, 1958, Ser. No. 765,728

13 Claims. (Cl. 260—256.4)

This invention relates to organic compounds which contain a quaternized heterocyclic nitrogen as part of their structure. In one specific aspect, it relates to derivatives of piperidine compounds which may be called N-aminopiperidinium salts.

It is an object of my invention to provide a new generic class of compounds having useful pharmaceutical properties.

The compounds of my invention are conveniently prepared by the action of chloramine on the appropriately substituted piperidine tertiary amine. Alternately, they can be prepared by the use of other aminating agents such as hydroxylamine-o-sulfonic acid or its salts. These direct aminations are far more suitable than other possible methods, for example, the cyclization-quaternization of properly substituted 1-alkyl-1(omegahaloamyl) hydrazines mainly because the starting materials are more readily available. In the preferred practice of this invention, the reactant tertiary amine dissolved in an unreactive solvent is exposed to a stream of gaseous chloramine. The resultant N-aminopiperidinium chloride is isolated by conventional laboratory techniques. Compounds containing anions other than chloride are prepared by metathesis starting with the chloride and a compound containing the anion to be introduced.

In accordance with the present invention, I have made available a new class of N-aminopiperidinium compounds corresponding to the general formula:

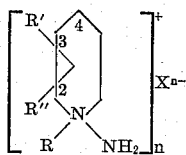

In the above formula, R may be lower alkyl or hydroxy lower alkyl. R' and R" are substituents on the 3 or 4 position of the piperidine ring as shown by the structural formula; both substituents must be on the same carbon atom. R' has the values hydrogen, alkyl, phenyl, halo phenyl and lower alkyl phenyl. R" may be hydroxy lower alkyl, acyloxy lower alkyl or acyloxy. For the purposes of this invention, acyloxy is defined as consisting of the following radicals: phenylcarbamyloxy, benzoyloxy, mandeloyloxy, diphenylacetoxy, benzilyloxy and fluorene-9-carbonyloxy. The structural formulae of these radicals, in the same order, are $C_6H_5NHCOO$, $C_6H_5COO$, $C_6H_5CHOHCOO$, $(C_6H_5)_2CHCOO$, $(C_6H_5)_2C(OH)COO$ and

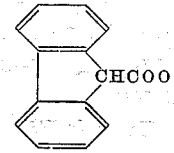

(The last structure is simply the diphenylacetoxy radical with a bond between the two phenyl groups). The above listed phenyl groups may contain nuclear halo and lower alkyl substituents; such compounds come within the express scope of my invention. X is an anion bearing the charge $n$; $n$ also represents the number of cations required to neutralize the anionic charge.

When my compounds are used for pharmaceutical purposes, X must be a pharmaceutically acceptable anion. The primary attributes of such an anion are nontoxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycolate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gantisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloroamination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. 1, 59 (1939). Alternatively, the chloramine can be formed in the presence of the amine as described in the copending application Serial No. 605,230 filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent, it is meant a solvent unreactive under the condition of the reaction. Solvents which serve this purpose include hydrocarbons, e.g., heptane, cyclohexane, benzene, xylene and the like; ethers e.g., diethyl ether, diamyl ether, dioxane and anisole; amides, e.g., dimethylforamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The scope and utility of my invention is further illustrated by the following examples:

*Example I*

Twenty grams of 1-methyl-3-hydroxymethylpiperidine was dissolved in 100 ml. of xylene. The solution was treated with 1.8 equivalents of chloramine over a period of 90 minutes using a generator prepared according to the teachings of Sisler et al. as described above. The hydrazinium salt precipitated from the reaction mixture in nearly quantitative amounts, the initial crystalline solid turning to a sticky brown resin on exposure to air. Trituration with diethyl ether followed by extraction with cold isopropyl alcohol gave, on vacuum drying at 25° C., a tacky amber resin containing 98% 1-amino-1-methyl-3-hydroxymethyl-piperidinium chloride. The product was extremely water-soluble and formed the corresponding picrate and hexafluorophosphate when treated with picric acid and potassium hexafluorophosphate respectively.

*Example II*

The piperidinium chloride of the previous example was treated with excess phenyl isocyanate in boiling anhydrous ethyl acetate containing a drop of pyridine. The resultant product, 1-methyl-1-amino-3-(N-phenylcarbamyloxy)methylpiperidinium chloride, was obtained as fine white crystals melting 133–134° C. It formed the corresponding picrate melting 151–153° C. having the following structure:

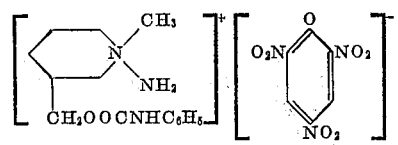

*Example III*

To a solution of 0.5 g. of the piperidinium chloride of Example I and 0.25 g. of pyridine in 25 ml. of chloroform, there was added at room temperature and in a dropwise fashion a solution of 0.80 g. of diphenylacetyl chloride in 10 ml. of chloroform. The reaction mixture was stirred for 10 minutes, refluxed for 2 hours additional and extracted with two 25 ml. portions of water. The aqueous extract was brought to a pH of about 8 with sodium carbonate and evaporated to dryness. The residue was extracted with boiling isopropyl alcohol and recrystallized from isopropyl alcohol-ethyl acetate. Pure 1-amino-1-methyl-3-diphenylacetoxymethylpiperidinium chloride thus obtained melted 138–139° C. and had the following structure:

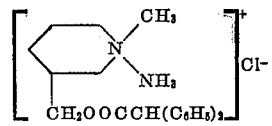

*Example II*

Fifty grams of dactil, 1-ethyl-3-diphenylacetoxypiperidine, dissolved in 800 ml. of chloroform was treated with gaseous chloramine as above. The reaction mixture was filtered from 9.7 g. of ammonium chloride and the filtrate evaporated to dryness. The 62.3 g. residue, an off-white very hygroscopic oil, was extracted with ether and the resultant crude solid recrystallized first from pyridine-benzene and then from methyl alcohol-benzene. There was obtained an 85% yield of 1-amino-1-ethyl-3-diphenylacetoxypiperidinium chloride as a fine white powder melting about 185° C. Calculated for $C_{21}H_{27}N_2O_2Cl$: percent C, 67.3; percent H, 7.27; percent N, 7.48; and percent Cl. 9.47. Found on analysis: percent C, 67.5; percent H, 6.92; percent N, 7.63; and percent Cl, 9.95.

*Example V*

Two parts of the product of Example IV and one part of sodium diethylbarbiturate were heated together in boiling isopropyl alcohol. The hot reaction mixture was filtered from the resultant sodium chloride. On cooling, 1-amino-1-ethyl-3-diphenylacetoxypiperidinium diethylbarbiturate crystallized from solution. It melted 176–178° C. and had the following structure:

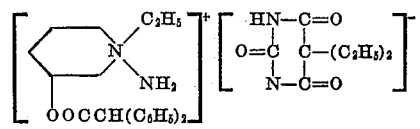

*Example VI*

Separate portions of the product of Example IV were heated with equal weights of benzoic and tartaric acids at about 120° C. for one-half hour. After cooling, each reaction mixture was taken up in water, the solution treated with activated charcoal, filtered, concentrated and poured into a five volume excess of dioxane. The white solids obtained on filtration contained only traces of chloride. The tartrate was extremely hygroscopic and the benzoate melted 141–142° C.

*Example VII*

A solution containing 26.2 g. of thionyl chloride in 150 ml. of carbon tetrachloride was added to 42 g. of fluorene-9-carboxylic acid in 100 ml. of the same solvent. The reaction mixture was refluxed 1.5 hours until it became homogenous and then the solvent and other volatile material was rapidly distilled off. To the acid chloride, the residual oil, there was added 100 ml. of dry benzene followed by 23 g. of 1-methyl-4-hydroxypiperidine dissolved in 150 ml. of the same solvent. After refluxing for 6.5 hours, the cooled reaction mixture was filtered to yield 4-(fluorene-9-carbonyloxy)-1-methylpiperidine hydrochloride melting at 220° C.

*Example VIII*

The produce of the previous example was treated with excess aqueous alkali and the resultant free base extracted with ether. The residue obtained after the distillation of the ether was dissolved in chloroform and treated with excess gaseous chloramine. After filtration from the ammonium chloride formed, the filtrate was evaporated to leave a gum-like residue. The residue was triturated in order with water, dioxane, benzene and hot hexane. Recrystallization of 1-amino-1-methyl-4-(fluorene-9-carbonyloxy)-piperidinium chloride from isopropyl alcohol gave the product as an off-white solid decomposing ca. 195° C. It formed the corresponding picrate and hexafluorophosphate decomposing at 146–148° C. and 138–140° C. respectively. The structure of the chloride is given below:

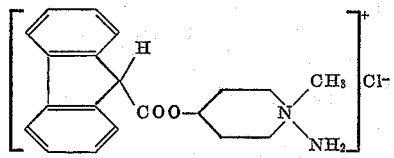

*Example IX*

Thirty grams of meperidine hydrochloride, 4-carboethoxy-4-phenyl-1-methyl-piperidine hydrochloride, also known as demerol, was shaken with 250 ml. of water, excess sodium carbonate and 400 ml. of chloroform. The liberated base passed into the organic layer which was separated and dried before being treated with excess chloramine. Evaporation of the filtrate containing the chloramine adduct of demerol (after removal of ammonium chloride) gave 29.7 g. of 94% pure product. On recrystallization from acetonitrile, there was obtained pure 1-amino-1-methyl-4-phenyl-4-carboethoxypiperidinium chloride melting 219° C. It formed a hexafluorophosphate (M.P. 112–113° C.) and a picrate (M.P. 224–225° C.) The chloride analyzed: percent C, 60.4; percent H, 7.87; percent N, 9.17; and percent Cl, 11.7. Calculated for $C_{15}H_{23}N_2O_2Cl$: percent, C, 60.2; percent H, 7.76; percent N, 9.34; and percent Cl, 11.8.

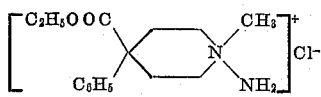

*Example X–XII*

Separate portions of the product of Example IX were reacted with equal weights of (a) the calcium salt of amphomycin (b) the potassium salt of penicillin and (c) the calcium salt of o-acetoxybenzoate. Aqueous solution of the first two were boiled together for 10 minutes and then evaporated to dryness. In the latter example, the dry solids were heated together at 120° C. for 30 minutes. All the residues were worked up by washing with chloroform and crystallization from ethyl acetate. There was obtained the amphomycin (M.P. 180° C.), the penicillin (M.P. 153° C.) and the o-acetoxybenzoate (M.P. 148–150° C.) salts respectively, corresponding to the chloride of Example IX.

*Example XIII–XVII*

Approximately 1% aqueous solutions of the chloride of Example IX were treated separately with 10% of saturated aqueous solutions of (a) potassium iodide (b) silver nitrate (c) potassium ferrocyanide (d) potassium ferricyanide and (e) sodium dihydrogen phosphate. 1-amino-1-methyl-4-phenyl-4-carboethoxypiperidinum iodide (M.P. 168–169° C.) precipitated slowly from (a). The nitrate was obtained as a hygroscopic solid from (b) after removal of silver chloride which precipitated immediately. The ferro- and ferricyanides were obtained from (c) and (d) respectively as light-unstable white precipitates. No precipitate resulted in (e) which was evaporated to dryness, the residue heated with a few drops of phosphoric acid and then triturated with 90% dioxane-10% water to give the highly hygroscopic and very acidic phosphate.

*Example XVIII*

In the general method for testing these compounds, mongrel dogs of either sex were anesthetized by the intraperitoneal administration of 100 mg./kg. of phenobarbital sodium and surgery was supported with intravenous pentobarbital sodium. A carotid artery was cannulated and connected to a mercury manometer for recording blood pressure and a Pfeiffer cannula was inserted into the trachea and connected to a Marey tambour for recording respiration. A femoral vein was exposed for the introduction of all test materials. Blood pressure and respiration were recorded by ink-writing levers on a conventional kymograph. Blood pressure responses to acetylcholine chloride, Adrenalin chloride (epinephrine), Leevophed (norepinephrine), nicotine salicylate and histamine phosphate were recorded at various times throughout the study.

*Example XIX*

Using the general method of the previous example, 1-amino-1-methyl-4-(fluorene-9-carbonyloxy) piperidinium chloride was dissolved in physiological saline at concentrations of 1.0 and 20 mg./ml. and administered to a female dog weighing 8.0 kg. Intravenous doses of 0.025, 0.125, 0.625, 1.25 and 20 mg./kg. were given over a period of approximately five hours. The depressor response to acetylcholine appeared to be moderately antagonized after the 0.125 mg./kg. dose and essentially abolished after the 0.625 mg./kg. dose. This finding suggests an atropine-like action of the test compound. The pressor response to nicotine was apparently antagonized after the 1.25 mg./kg. dose suggesting that the test compound also possesses a ganglionic blocking action.

*Example XX*

Using the general method of Example XVIII, 1-amino-1-ethyl-3-diphenylacetoxypiperidinium chloride was dissolved in physiological saline at concentrations of 1.0 and 20 mg./ml. and administered to a female dog weighing 7.9 kg. Intravenous doses of 0.05, 0.25, 1.25, 6.25 and 12.5 mg./kg. were given over a period of approximately three hours. The depressor response to acetylcholine appeared to be antagonized after the 0.05 mg./kg. dose and essentially abolished after the 0.25 mg./kg. dose. The pressor response to nicotine was antagonized following the 1.25 mg./kg. dose and abolished following the 6.25 mg./kg. dose. These findings suggest that the test compound possessed both an atropine-like effect and a ganglionic depressant action. The probability that this compound possesses ganglionic depressant properties is supported by the finding that a pressor response could not be elicited by a ganglionic stimulant dose of acetylcholine, even though the peripheral vasocilatory effect of acetylcholine has been abolished.

*Example XXI*

Using the general method of Example XVIII, 1-amino-1 - methyl - 4 - phenyl - 4 - carboethoxypiperidinium chloride was dissolved in physiological saline at concentrations of 1.0 and 20 mg./ml. and administered to a female dog weighing 10.8 kg. Intravenous doses of 0.05, 0.25, 1.25, 6.25 and 12.5 mg./kg. were given over a period of approximately four hours. The depressor response to acetylcholine appeared to be slightly antagonized following the 0.25 mg./kg. dose but was not abolished by any dose of the test compound. The compound appears to possess very mild atropine-like activity.

I claim:

1. Compounds having the formula:

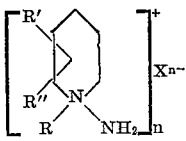

wherein R is a member selected from the group consisting of lower alkyl and hydroxy lower alkyl; R' is a member selected from the group consisting of hydrogen, lower alkyl, phenyl, halo phenyl and lower alkyl phenyl; R" is a member selected from the group consisting of hydroxy lower alkyl, benzoyloxy, mandeloyloxy, phenylcarbamyloxy, diphenylacetoxy, benzilyloxy, carboloweralkoxy, fluorene-9-carbonyloxy, benzoyloxy lower alkyl, mandeloyloxy lower alkyl, phenylcarbamyloxy lower alkyl, diphenylacetoxy lower alkyl, benzilyloxy lower alkyl and fluorene-9-carbonyloxy lower alkyl; X is a pharmaceutically acceptable anion; and $n$ is a positive integer less than four.

2. Compounds according to claim 1 wherein R is lower alkyl, R' is hydrogen, R" is hydroxy lower alkyl and X is chloride.

3. Compounds according to claim 1 wherein R is lower alkyl, R' is hydrogen, R" is phenylcarbamyloxy lower alkyl and X is chloride.

4. Compounds according to claim 1 wherein R is lower alkyl, R' is hydrogen, R" is diphenylacetoxy and X is chloride.

5. Compounds according to claim 1 wherein R is lower alkyl, R' is phenyl, R" is carboloweralkoxy and X is chloride.

6. 1 - Amino - 1 - methyl - 3 - hydroxymethylpiperidinium chloride.

7. 1 - Methyl - 1 - amino - 3 - (N - phenylcarbamyloxy)-methylpiperidinium picrate.

8. 1 - Amino - 1 - methyl - 3 - diphenylacetoxymethylpiperidinium chloride.

9. 1 - Amino - 1 - ethyl - 3 - diphenylacetoxypiperidinium diethylbarbiturate.

10. 1 - Amino - 1 - ethyl - 3 - diphenylacetoxypiperidinium chloride.

11. 1 - Amino - 1 - methyl - 4 - (fluorene - 9 - carbonyloxy)-piperidinium chloride.

12. 1 - Amino - 1 - methyl - 4 - phenyl - 4 - carboethoxypiperidinium o-acetoxybenzoate.

13. 1 - Amino - 1 - methyl - 4 - phenyl - 4 - carboethoxypiperidinium iodide.

No references cited.

UNITED STATES PATENT OFFICE
CERTIFICATION OF CORRECTION

Patent No. 2,957,876            October 25, 1960

Bernard Rudner

It is hereby certified that error appears in the above numbered patent requiring correction and that the said Letters Patent should read as corrected below.

Column 3, line 32, after "sulfate" insert -- by --; column 4, lines 38 to 42, the formula should appear as shown below instead of as in the patent:

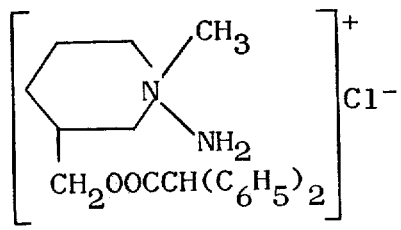

column 5, line 25, for "produce" read -- product --; column 6, line 42, for "Leevophed" read -- Levophed --.

Signed and sealed this 6th day of June 1961.

(SEAL)
Attest:

ERNEST W. SWIDER
Attesting Officer

DAVID L. LADD
Commissioner of Patents